US010207294B2

(12) United States Patent
Abedalsada Mahdi

(10) Patent No.: US 10,207,294 B2
(45) Date of Patent: Feb. 19, 2019

(54) SORTING AND DISTRIBUTION SYSTEM

(71) Applicant: Talib Abedalsada Mahdi, Aneby (SE)

(72) Inventor: Talib Abedalsada Mahdi, Aneby (SE)

(*) Notice: Subject to any disclaimer, the term of this patent is extended or adjusted under 35 U.S.C. 154(b) by 0 days.

(21) Appl. No.: 15/490,958

(22) Filed: Apr. 19, 2017

(65) Prior Publication Data
US 2017/0282217 A1  Oct. 5, 2017

Related U.S. Application Data

(63) Continuation of application No. PCT/SE2015/051046, filed on Oct. 5, 2015.

(30) Foreign Application Priority Data

Oct. 23, 2014 (SE) .................. 1451272-7

(51) Int. Cl.
| | | |
|---|---|---|
| B65G 47/71 | (2006.01) | |
| B65G 47/52 | (2006.01) | |
| B65G 47/53 | (2006.01) | |
| B07C 3/08 | (2006.01) | |
| B65G 1/04 | (2006.01) | |
| B65G 1/137 | (2006.01) | |
| B65G 47/50 | (2006.01) | |
| B65G 37/02 | (2006.01) | |

(52) U.S. Cl.
CPC .............. B07C 3/08 (2013.01); B65G 1/0478 (2013.01); B65G 1/1376 (2013.01); B65G 47/50 (2013.01); B65G 47/53 (2013.01); B65G 37/02 (2013.01)

(58) Field of Classification Search
None
See application file for complete search history.

(56) References Cited

U.S. PATENT DOCUMENTS

| | | |
|---|---|---|
| 3,100,040 A | 8/1963 | Kleist |
| 3,252,595 A | 5/1966 | Collins et al. |
| 3,662,874 A | 5/1972 | Muller |
| 4,848,558 A | 7/1989 | Rechsteiner |
| 5,085,310 A | 2/1992 | Scata et al. |
| 5,125,782 A | 6/1992 | Goldschmidt et al. |

(Continued)

FOREIGN PATENT DOCUMENTS

| | | |
|---|---|---|
| DE | 102010010433 A1 | 9/2011 |
| EP | 1205266 A1 | 5/2002 |

(Continued)

*Primary Examiner* — Kavel Singh
(74) *Attorney, Agent, or Firm* — Gabriela B. Tomescu, Esq.; Bergenstråhle & Partners AB

(57) ABSTRACT

Disclosed is a sorting and distribution system for sorting a number of different types of articles to a number of different clients depending on types and amounts of articles ordered by the different clients. The system comprises a plurality of article tracks and a plurality of order tracks arranged substantially transverse to the plurality of article tracks. Each order track is divided into m order track parts. The system further comprises a control unit controlling movement of the plurality of order tracks and movement of articles arranged on the plurality of article tracks to the plurality of order tracks such that an article positioned on a first article track is moved to a first order track part of a first order track when a first client to which the first order track part is associated has ordered a first article type.

1 Claim, 11 Drawing Sheets

(56) References Cited

U.S. PATENT DOCUMENTS

| | | | |
|---|---|---|---|
| 5,564,879 A | 10/1996 | Noguchi | |
| 6,139,240 A | 10/2000 | Ando | |
| 6,854,583 B1 * | 2/2005 | Horn | B65G 49/064 198/346.2 |
| 8,113,334 B2 * | 2/2012 | Layne | B07C 3/08 198/348 |
| 8,397,897 B2 * | 3/2013 | Bastian, II | B65G 1/026 198/347.1 |
| 9,290,323 B2 * | 3/2016 | Engle | A23L 3/04 |
| 9,397,897 B2 * | 7/2016 | Sasaki | H04L 41/145 |
| 9,409,709 B2 * | 8/2016 | Keating | B65G 1/02 |
| 9,741,009 B2 * | 8/2017 | Berghorn | G06Q 10/08 |
| 2004/0073333 A1 | 4/2004 | Brill | |
| 2009/0242356 A1 | 10/2009 | Layne | |

FOREIGN PATENT DOCUMENTS

| | | |
|---|---|---|
| EP | 2532446 A1 | 12/2012 |
| JP | H02205535 A | 8/1990 |
| JP | 45246 A | 2/1998 |
| WO | 2014/080041 A1 | 5/2014 |

* cited by examiner

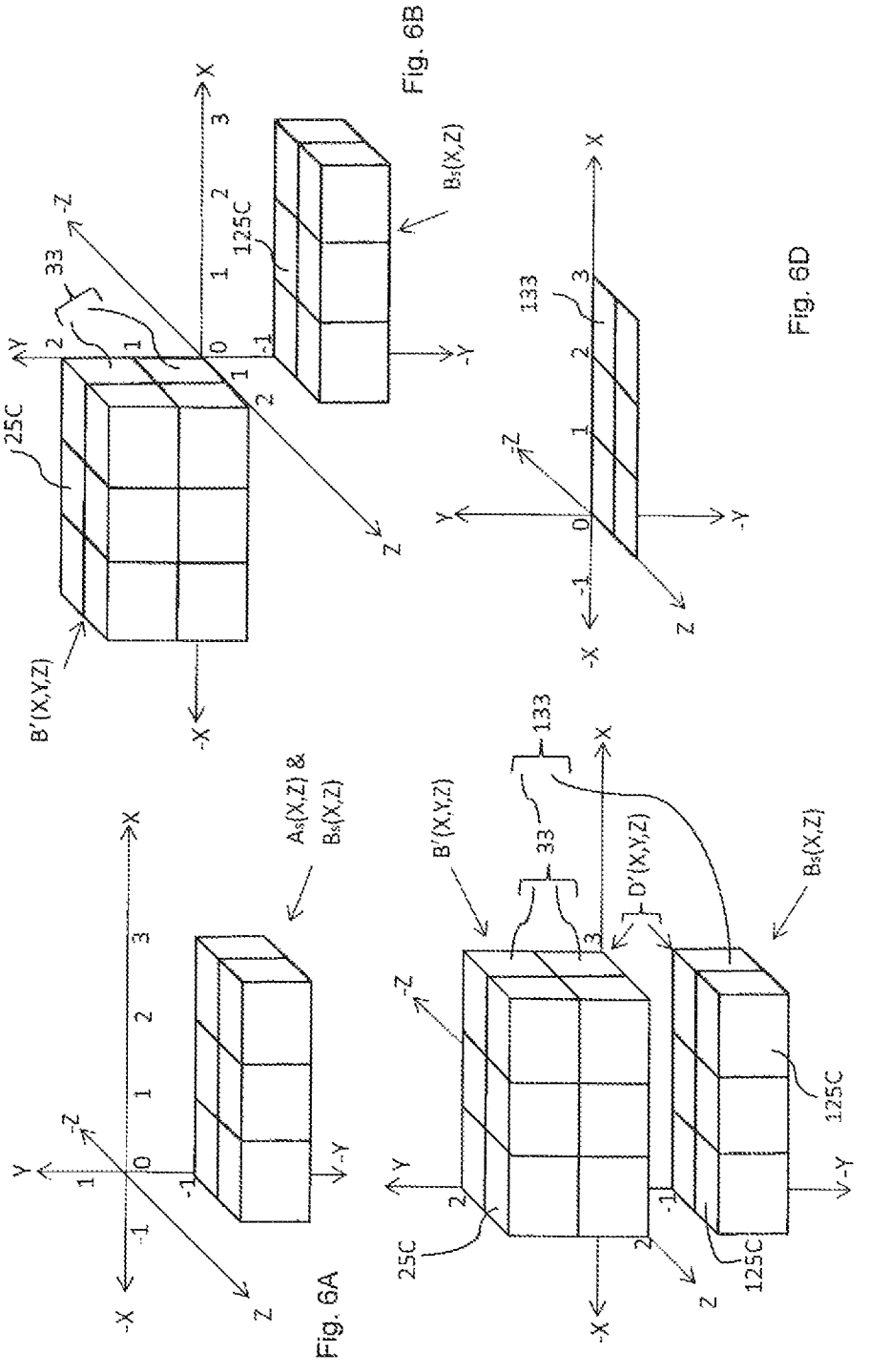

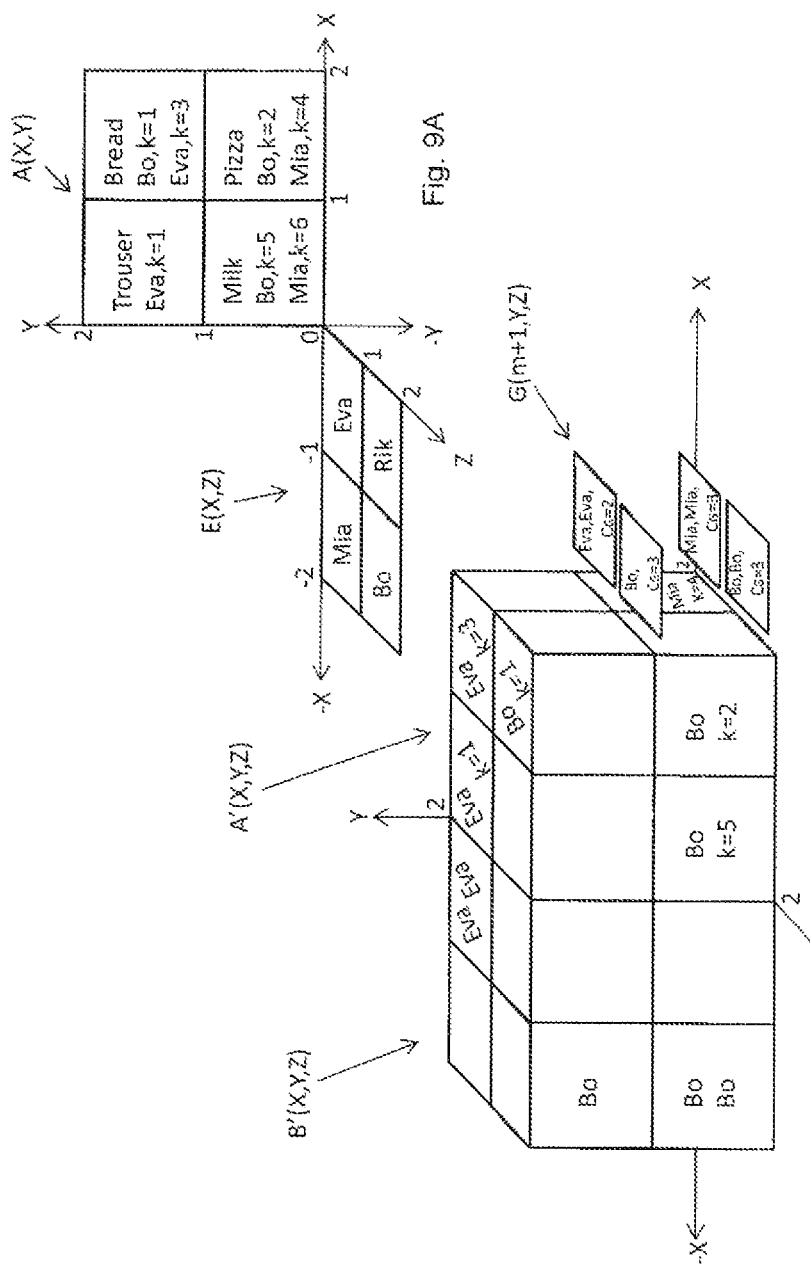
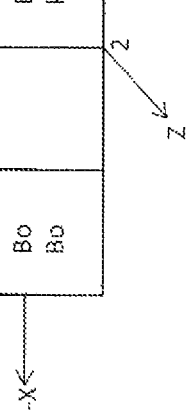
Fig. 9A
Fig. 9B

SORTING AND DISTRIBUTION SYSTEM

This application is the continuation of International Application No. PCT/SE2015/051046, filed 5 Oct. 2015, which claims the benefit of Swedish Patent Application No. SE 1451272-7, filed 23 Oct. 2014, the entire contents of which are hereby incorporated by reference.

TECHNICAL FIELD

The present invention relates generally to a sorting and distribution system for sorting a number of different types of articles to a number of different clients depending on types and amounts of articles ordered by the different clients.

BACKGROUND ART

In today's society distribution of articles across the world is ever increasing. With this development follows development of automatic storage enterprises for quickly and automatically being able to sort and distribute articles to clients.

U.S. Pat. application U.S. Pat. No. 6,139,240 A1 shows an automatic storage/sorting system that has a number of transport conveyors, wherein a first number of conveyors extend in a first direction and a second number of conveyors extend in a second direction. The first number of conveyors is used for storing articles to be sorted and the second number of conveyors is used for distributing the articles to receivers, or at least to storage places associated with the respective receiver.

European patent EP 1310441 describes a system in an automated storage which has a number of transport conveyors in different levels. Each level has at least one first transport conveyor for distributing the articles and one second conveyor, perpendicular to the first conveyor for transporting distributed articles to different storages for different article receivers.

U.S. Pat. No. 5,125,782 shows an automatized storage with a number of storage conveyors arranged in a plurality of layers. Each layer further has transversely extending conveyors that can be driven both backwards and forwards.

US patent application US 2009/0242356 shows a sorting system with transport conveyors where the conveyors are arranged in a matrix system. This sorting system has a plurality of first conveyors on which different articles may be positioned and a plurality of second conveyors, each second conveyor being associated with a receiver of articles, such as a storage location. The plurality of second conveyors extends in a direction perpendicular to the plurality of first conveyors. A transfer conveyor is provided for transferring articles from one of the first conveyors to one of the second conveyors.

In such sorting systems each receiver of articles (i.e. client) has one second conveyor/second number of conveyor of its own. This means that if there are many different receivers there has to be many second conveyors and the system will become very big. Consequently, with many second conveyors, the system will be expensive and need lots of space.

Therefore, there is a need for an article sorting system that can handle sorting of many different articles to many different receivers in a less expensive way and that needs less space for realization than in the prior art.

SUMMARY OF INVENTION

It is an object of the invention to address at least some of the problems and issues outlined above. It is possible to achieve these objects and others by using a method and a system as defined in the attached independent claims.

According to a first aspect, a sorting and distribution system is provided for sorting a number of different types of articles to a number of different clients depending on types and amounts of articles ordered by the different clients. The system comprises a plurality of article tracks, each articles track being arranged to receive and transport at least one type of article and a plurality of order tracks arranged substantially transverse to the plurality of article tracks. Further, the plurality of article tracks are arranged in relation to the plurality of order tracks such that articles situated on any of the article tracks can be moved to the order tracks. Further, each order track is divided into m order track parts by order track partitions. Further, the system comprises a control unit controlling movement of the plurality of order tracks and movement of articles arranged on the plurality of article tracks to the plurality of order tracks based on client order information received by the control unit such that a first article positioned on a first article track is moved to a first order track part when a first client to which the first order track part is associated has ordered a first article type according to the client order information, and when the first order track part is in a correct position for receiving the first article. According to an embodiment, each order track may be arranged as a rotating endless loop.

By a system as described above it is possible to move different types of articles to an order track part associated with one client depending on if the client has ordered such articles. Such a system may be much more densely arranged in comparison to a prior art system, which has one order track per client, whereas in the present invention each order track is divided into m order track parts such that m number of clients may share one order track. This makes it possible to deliver articles to more clients in the same space as has to be used in the prior art.

The above method and system may be configured and implemented according to different optional embodiments. In one possible embodiment, the system is arranged in a three-dimensional room defined with an x-, y- and z-axis where the plurality of article tracks extend in a z-direction and each article track is divided into a plurality of article track parts and the plurality of article tracks are arranged as an article track matrix $A(x,y)$ such that an article track part matrix $A'(x,y,z)$ is created. Further, the plurality of order tracks extend in a x-direction and the plurality of order tracks are arranged as an order track matrix $B(y,z)$ such that an order track part matrix $B'(x,y,z)$ is created. According to another possible embodiment, the control unit is further arranged to control the plurality of order tracks such that they are driven synchronously, rotating with a time period C. The time period C is the time it takes for the endless loops of the order tracks to perform one revolution.

Further possible features and benefits of this solution will become apparent from the detailed description below.

BRIEF DESCRIPTION OF DRAWINGS

The invention is now described, by way of example, with reference to the accompanying drawings, in which:

FIGS. 6A-D are sketches illustrating mathematical descriptions of interaction between of an order track matrix and a single order matrix.

FIGS. 9A-B illustrate an example of orders and interaction between article tracks and order tracks.

DESCRIPTION OF THE EMBODIMENTS

Figure 1:
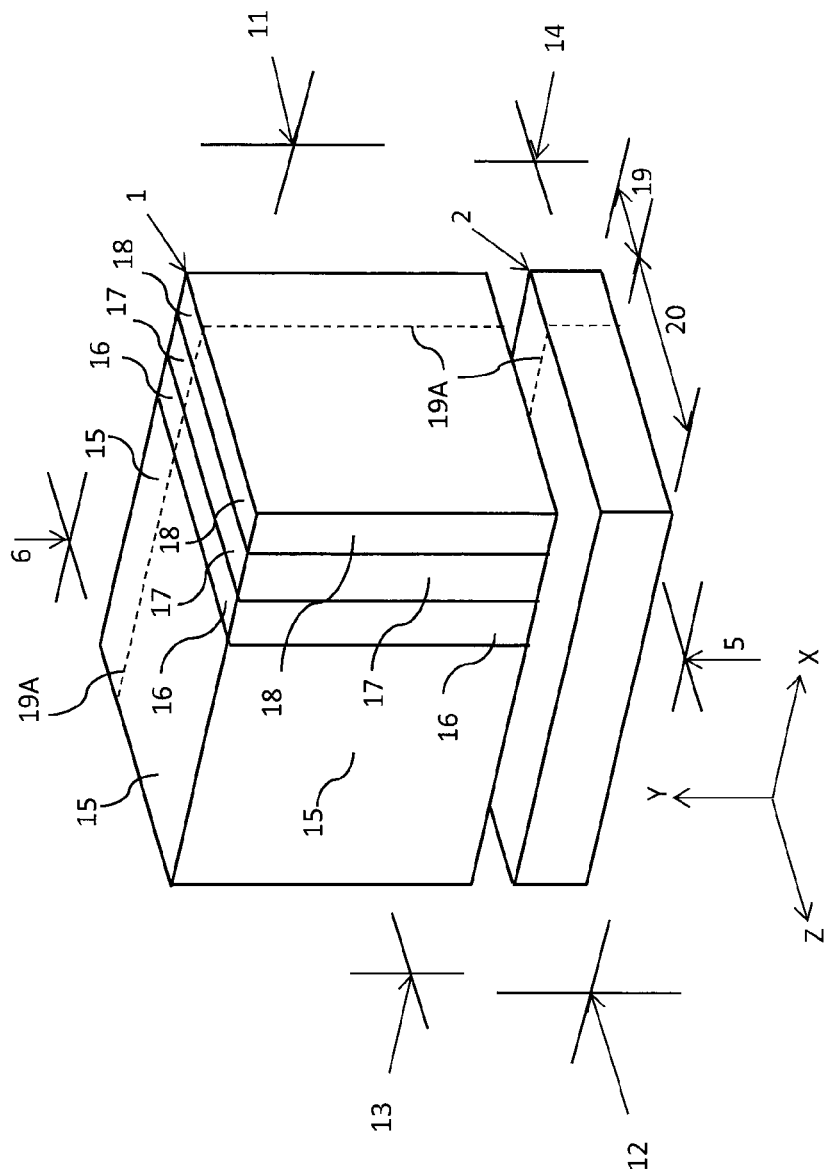
FIG. 1 is a perspective view of an outline of a distribution and sorting system according to an embodiment of the invention.

Briefly described, a solution is provided for facilitating sorting and distribution of articles in an automatic sorting and distribution center. This is achieved by a sorting and distribution system in which sorting is a continuous operation performed in a matrix of article tracks and order tracks, e.g. conveyors, overlapping each other, which order tracks are divided into order track parts and the order tracks may be driven synchronously such that different type of articles delivered on different article tracks may be delivered to the same client at a receiving section at an end of the order tracks at substantially the same time.

The sorting and distribution system may have a sorting and distribution section having a number of article tracks for delivering different types of articles, e.g. one article type for each track, and a number of order tracks transversely arranged to the article tracks and arranged in relation to the article tracks such that articles may be distributed from the article tracks to the order tracks depending on which client that has ordered which types of articles. Further, the order tracks are divided into order track parts, wherein individual of the order track parts can be allocated to different clients. The system further comprises a control unit that controls delivery of articles to the order track parts based on which article a client has order and based on which order track part that belongs to the client. This is achieved by controlling the delivery of a first article ordered by a first client to which a first order track part of a first order track is allocated such that the first article arranged on the first article track is delivered to the first order track part when the first order track part is positioned at, or close to, a point where the first order track crosses the first article track.

The order tracks may be conveyor bands. The conveyor bands may be arranged as endless loops. The position of the order tracks in relation to the article tracks can be controlled by sensing when the order tracks pass a calibration point. The order tracks may be controlled synchronously such that first order track parts of all order tracks keep the same position in relation to each other. Then the control unit knows the positions of all order track parts in relation to each other. Further, in the control system the physical position of the individual article tracks in relation to the individual order tracks may be input, as well as to which client each order track part is allocated and which client has ordered which articles. Alternatively, the position of the order track parts can be controlled by a sensor arranged to detect crossing of the different article tracks such that when it is detected that the first order tracks part crosses the first article track, in the example above where the first client being allocated the first order track part of the first order track has ordered a first article, the first article is delivered to the first order track.

FIG. 1 is an overview of an embodiment of a sorting and distribution system according to the invention. The system in FIG. 1 comprises different sections of which some are optional. The system comprises a section 1 for sorting and distributing a number of different types of articles to a number of different clients depending on which types of articles and amounts of the different types that the clients have ordered. The articles in the sorting and distribution section 1 may be any kind of articles that are to be distributed from a storage to a lot of different clients, such as furniture, groceries etc. The system also comprises an optional single order section 2 in which single packages addressed to the different clients of the sorting and distribution system are handled. The packages may be such packages that are typically delivered by a postal service today. The sorting and distribution section 1 may optionally comprise different temperature sections for being able to sort articles that require storing in different temperatures. The temperature sections may be a normal temperature section 15, e.g. 20° C., in which articles such as furniture or any kind of article that are best stored in normal room temperature, a freezing section 16 in which articles to be treated at freezing temperature can be sorted, such as ice cream, a cooling section 17, e.g. 5° C. in which e.g. groceries such as milk may be sorted and distributed, and a heating section 18, having a temperature above 20° C. in which e.g. hot meals may be sorted and distributed. The sorting and distribution section may further comprise a storage section 19 in which the articles to be sorted and distributed are arranged before they are sorted and a distribution section 20 in which the articles are distributed (or sorted) to the different clients depending on which articles the clients have ordered. A border 19A may also be defined between the storage section 19 and the distribution section 20. In FIG. 1 there is also defined space concepts used in describing the invention in the forthcoming figures, such as a back side 11 and a front side 12 opposite the backside, a left side 13 and a right side 14 opposite the left side, and a bottom side 5 and a top side 6 opposite the bottom side. Further, there is defined a coordinate system from these side definitions in which an x-axis extends from the left side to the right side, a z-axis extending from the back side to the front side and being perpendicular to the x-axis, and a y-axis extending from a bottom side to a top side and being perpendicular to both the x-axis and the z-axis. In FIG. 1, the single order section 2 is arranged below the sorting and distribution section 1, i.e. at the bottom side 5.

Figure 2:
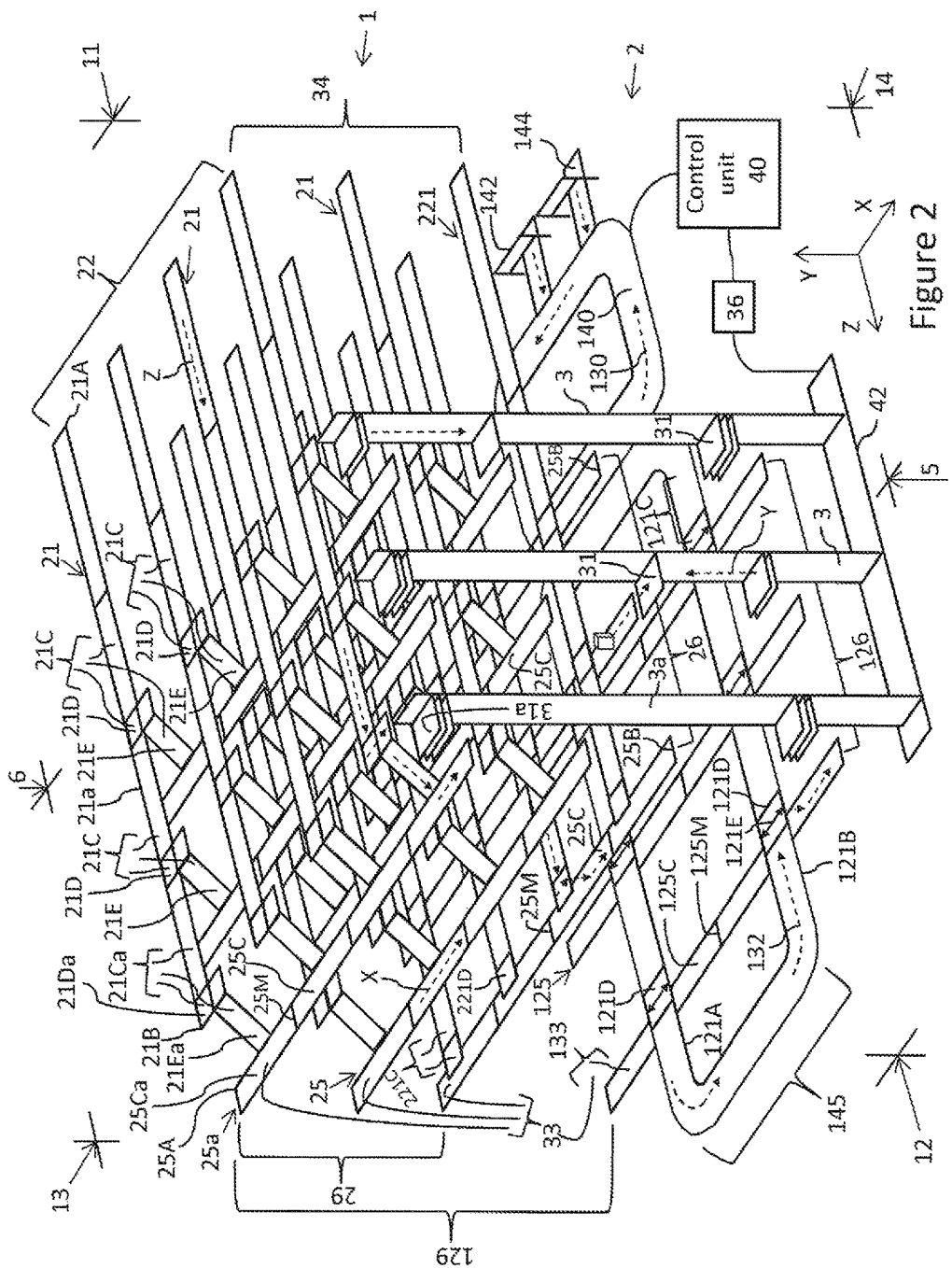
FIG. 2 is a perspective view in more detail of a distribution and sorting system according to an embodiment.

FIG. 2 shows an embodiment of the sorting and distribution system comprising an embodiment of the sorting and distribution section 1 combined with an embodiment of the single order section 2. However, the sorting and distribution section 1 can be used separately, without the single order section 2. Similarly, the single order section 2 can be used without the sorting and distribution section 1. Consequently, the sorting and distribution system may comprise the sorting and distribution section 1 and/or the single order section 2. The sorting and distribution section comprises a plurality of article tracks 21, each articles track being arranged to receive and transport a type of article. The article tracks extend from an article track start 21A to an article track end 21B. The article track start is situated in the storage section 19 and the article track end in the distribution section 20.

The sorting and distribution section further comprises a plurality of order tracks 25 arranged substantially transverse to the plurality of article tracks 21 and, looking in the y-direction, overlapping each other. Further, each order track is preferably arranged as a rotating endless loop. The plurality of article tracks 21 are arranged in relation to the plurality of order tracks 25 such that articles situated on any of the article tracks 21 can be moved to the order tracks 25. The order tracks extend from an order track start 25A to an order track end 25B. However, as the order tracks are arranged as rotating endless loops it means that the order tracks travel in a loop from the start to the end and back to the start again. Each order track 25 is divided into m order track parts 25C by order track partitions 25M. When the order track is moving, a first order track part moves from the order track start 25A, which may be at or before a crossing with the first article track, seen in the x-direction, from the left side 13 to the right side 14, to the order track end 25B where a receiving section 42 is situated. The system further comprises a control unit 40 controlling movement of the plurality of order tracks 25 and movement of articles arranged on the plurality of article tracks 21 to the plurality of order tracks 25 based on client order information received by the control unit such that a first article positioned on a first article track 21a is moved to a first order track part 25Ca of a first order track 25a when a first client to which the first order track part is associated has ordered a first article type according to the client order information, and when the first order track part 25Ca is in a correct position for receiving the first article.

Client order information defines which client that has ordered which articles. The control unit is arranged to receive the client order information as input and to deliver control signals to move articles from the plurality of article tracks to the plurality of order tracks when the order track part belonging to the client that has ordered an article is correctly positioned such that it can receive an article that has been ordered according to the client order information. The correct position for this order track part is then the position when the order track part can receive the article the client has ordered. This position may for example be directly below a place where the article track on which the article is positioned crosses the order track to which the order track part belongs, or at the end of a ramp connecting the article track to the order track to which the order track part belongs.

By the control unit controlling the movement of the order tracks and the movement of articles positioned on the article tracks to the order track parts it is possible to know when a certain order track part is in the correct position to receive a certain article. This control may be realized in many different ways. According to a first embodiment, the order tracks are controlled synchronously such that they move with the same velocity, performing one revolution in the time period C, and all order tracks starting from the same starting position at time 0. Then the control unit knows where each order track part is positioned at each time instance. By also knowing the position of the article tracks, the control unit can easily calculate the time instant when a first order track part is at the correct position for receiving an article arranged on a first article track, for example when the first order track part crosses the first article track. When this time instant occurs, the control unit triggers movement of an article on the first article track to the first order track part. According to a second embodiment, there are sensors arranged at the order track parts, preferably at the client order part partition of the two client order partitions that defines an order track part that is first in the movement direction of the order track. The sensors may co-operate with corresponding sensors at the article tracks such that when the order track partition of a first order track part crosses an article track on which there is an article that is to be delivered to the client associated with the first order track part, the control unit triggers movement of an article on this article track to the first order track part. Also, it may be possible to use sensors in the first embodiment to control that the order track are moving in synchronicity. Such sensors may be arranged at a starting point for each order track, to detect when a first order track part passes the starting point, if there is a discrepancy between the expected time when the first order track part should pass the starting point and the actual starting point, the control unit can adapt the pace for individual order tracks, or simply stop the system to restart it.

According to an embodiment, neighbouring article tracks 21 are separated from each other in the extension direction of the order tracks with a distance approximately the same as the distance between neighbouring order track partitions 25M. However, it may also be possible to have more than one article track within the distance between neighbouring order track partitions such that articles can be delivered from more than one article track to one order track part more or less simultaneously.

By a system as described above it is possible to move different types of articles to an order track part associated with one client depending on if the client has ordered such articles. Such a system may be much more densely arranged in comparison to a system of US2009/0242356 which has one order track per client, whereas in the present invention each order track is divided into m order track parts such that m number of clients may share one order track. This makes it possible to deliver articles to more clients in the same space as has to be used in the prior art.

The article tracks may be conveyors such as endless loop tracks or alternatively they are stationary tracks on which the articles are pushed.

According to an embodiment, the system is arranged in a three-dimensional room defined with an x-, y- and z-axis where the plurality of article tracks extend in a z-direction and the plurality of article tracks are arranged as an article track matrix A(x,y), with m*n number of article tracks, where m is the number of article track columns (in x-direction) and n the number of article track rows (in y-direction). Further, the plurality of order tracks extend in a x-direction and the plurality of order tracks are arranged as an order track matrix B(y,z), with n*r number of order tracks, where n is the number of order track rows (in y-direction) and r the number of order track columns (in z-direction). As mentioned, each of the order tracks are divided into m order track parts 25C by order track partitions 25M. Thereby, an order track part matrix B'(x,y,z) is created with in total m*n*r order track parts.

In the embodiment of FIG. 2, the article tracks are also divided into article track parts 21C, e.g. r article track parts per article track. Each article track part 21C may comprise an article transfer means 21D for transferring an article from the article track part 21C to a crossing (or overlapping) order track part 25C. Further, some article track parts 21C may comprise a ramp 21E onto which article transferred by the article transfer means are moved down to a crossing order track part. Further, an article track part 21C may also comprise a distance of the article track, from (but not including) an article transfer means 21D of the in z-direction previous article track part, towards (and including) the article transfer means 21D of the article track part. Thereby, an article track part matrix A'(x,y,z) is created. The article track part matrix A'(x,y,z) overlaps the order track part matrix B'(x,y,z). According to an embodiment, the control unit 40 is further arranged to drive the plurality of order tracks 25 synchronously such that the plurality of order tracks rotate with a time period C. When the endless loops of the order tracks are driven synchronously, the order track part matrix B'(x,y,z) and the article track part matrix overlaps each other, such that the order track part matrix B'(x,y,z) "moves through" the article track part matrix A'(x,y,z). By driving the order tracks synchronously, a column of order track parts will arrive substantially simultaneously at an article track column. This makes it possible to for example allocate order track parts from different order tracks to the same client, and for a receiving section to collect articles from different order track parts and put them together as a package for one client.

Further, the order track parts that are arranged vertically (in the y-direction) into one y-directed client column 33 may be allocated to one client. By synchronously driving the order tracks such that the order track parts of one column arrives at the end of the order track at the same time, articles to be delivered to the same client can be collected at the end 25B of the order track at the same time. A client order matrix E(x,z) may be set up for the different client columns 33. Of course it is possible that one larger client has more than one column.

According to an embodiment, the control unit 40 is arranged to drive the order tracks 25 in steps, stopping for receiving articles from the article tracks between each drive step. By driving the order tracks in such steps, they can be stopped between each step and positioned such that an order track part can receive an article from an article track. This is facilitated if the order tracks are driven by the control unit such that they stop for some seconds between each drive step. According to an embodiment, the number of drive steps in one revolution may be twice as many as the number of order track parts of an order track. When the order tracks are driven in steps in such a way, the order track part matrix B'(x,y,z) is moved into the article track part matrix A'(x,y,z) in steps, such that at a first drive step from a starting position, the order track part matrix is driven into the article track part matrix and stopped so that a first order track part (1,y,z) of each order track will be situated in the correct position for receiving articles from its corresponding first article track (1,y,z), i.e. the article tracks arranged closest to the order track start 25A. At the second step, the tracks are driven and stopped so that the first order track parts (1,y,z) will be in the correct position for receiving articles from the second article tracks (2,y,z) and the second order track parts (2,y,z) following the first order track parts will be in the correct position for receiving articles from the first article tracks (1,y,z), and so on for the third and fourth step etc.

When the order track parts have passed through the article track part matrix A'(x,y,z) and received articles from the article tracks they have passed, they will reach the end 25B of its respective order track, and make a u-turn and return back to the starting position with the order track parts returning back to the start now facing the bottom side 5 of the sorting and distribution section. At step m the first order track parts (1,y,z) arrive at the end 25B, and at step m+1 the articles are moved to elevator carriages 31 of elevators 3. Consequently, according to an embodiment, the system further comprises a receiving section 42 positioned at the end (or side) 25B of the order tracks 25 in a driving direction of the order tracks 25 after the order track parts 25C have passed the article tracks 21, the receiving section being positioned such that it can receive articles when the order track parts arrives at the end 25B of the order tracks. By such a receiving section 42 it is possible to collect the different types of articles situated in one order track part when the order track part has passed the article tracks and arrived at the end of the order track where it is to make a u-turn back to the start again. The articles in the order track parts may move automatically to the receiving section as the order track move and the order track parts pass the receiving section and start returning back to the starting side close to a first order track. Alternatively, the control system 40 may be arranged to trigger movement of the articles arranged on an order track part 25C to the receiving section 42 when the order track part arrives at the receiving section. This may be accomplished by the distribution and sorting system for example having article transferring means arranged at the end of the order tracks, which article transferring means are controlled by the control system to transfer the articles arranged on an order track part to the receiving section when the order track part arrives at the receiving section.

According to an embodiment, the receiving section 42 comprises a number of r elevators 3, individual of the elevators being positioned at the end 25B of individual of the order tracks, and each elevator having a number of elevator carriages 31. Further, the control unit 40 is arranged to control the number of elevators such that a first 31a of the number of elevator carriages 31 of a first 3a of the number of elevators 3 is driven to a position nearby a first order track 25a to which the first order track part 25Ca is a part, when the first order track part 25Ca arrives at the end 25B of the first order track 25a and when the first order track part has received one or more article. The number of elevators r is the same as the number of order track columns r. That the first of the number of elevator carriages is driven to a position nearby a first order track signifies that the first elevator carriage is at a position where it is able to receive articles arranged in the first order track part after the first order track part has passed article tracks. The first elevator carriage may e.g. at this receiving position be so close to the delivery side 25B of the first order track that it automatically receives the articles when the endless loop that the first order track 25a constitutes makes a u-turn, or alternatively so that an article transfer means arranged at the delivery side 25B of an order track can transfer the articles from the first order track part to the first carriage of the first elevator. By having elevators 3 in the receiving section 42 being controlled as above it is made possible to collect articles sorted into different order track parts at the end of the order track also when the order tracks are positioned in different heights, i.e. in different positions in the y-direction. According to an embodiment, the number of elevator carriages may be fewer than the number of order tracks in an order track column. According to an embodiment, the elevator carriages may have an idle position (i.e. a waiting position when not being controlled to collect sorted articles) which may be at the top of their corresponding elevator, above the uppermost order track row, and/or at the bottom of their corresponding elevator.

In the embodiment where the order tracks are driven in 2*m steps and the number of order track parts per order track is m, the first order track part of each order track is filled with articles from the different article tracks in steps 1 to m and emptied at step m+1. The second order track part of each order track is filled with articles from the article tracks in steps 2 to m+1 and emptied at step m+2 and so on until the last order track part which is filled with articles in steps m to 2*m−1 and emptied at step 2*m. Consequently, at each step from m to 2*m−1 the control unit is instructing the respective carriage 31 to be driven to the collecting position for an order track to collect the articles arranged on the order track part that is at the collecting position, if there are any articles in the order track part, according to the client order information. After collecting articles, the carriage 31 is driven to the bottom of the elevator 3 where the articles in the carriage are collected at a collecting section. Consequently, the receiving section 42 may further comprise a collecting section, and the control unit is arranged to drive the elevator carriages 31 to the collecting section for emptying the elevator carriages after the elevator carriages have received articles from one or more of the order track parts. By such a collecting section all sorted articles are collected before the elevator is used for consecutive order track parts arriving at the end of an order track.

Figure 3:
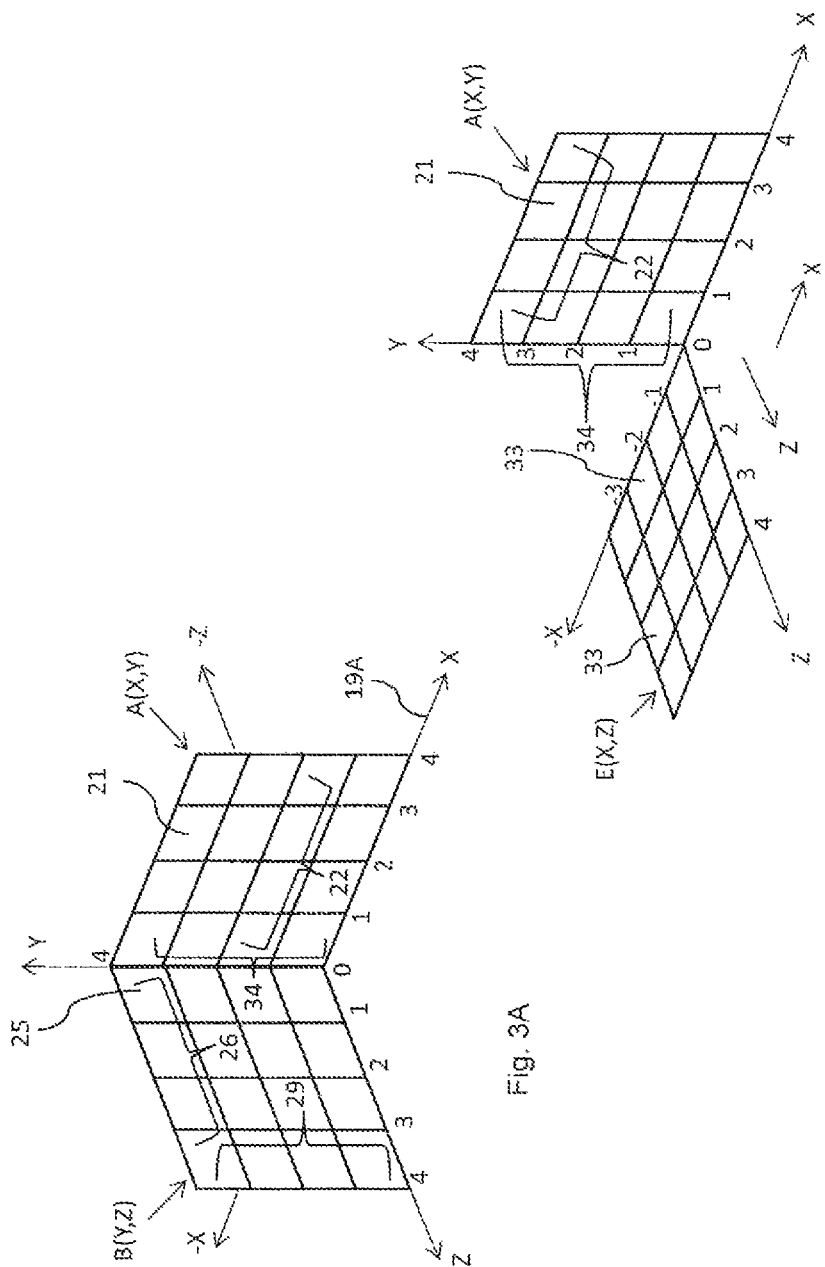
FIGS. 3A, 3B, 4A and 4B are sketches illustrating mathematical descriptions of interaction between article tracks and order tracks.
Figure 4:
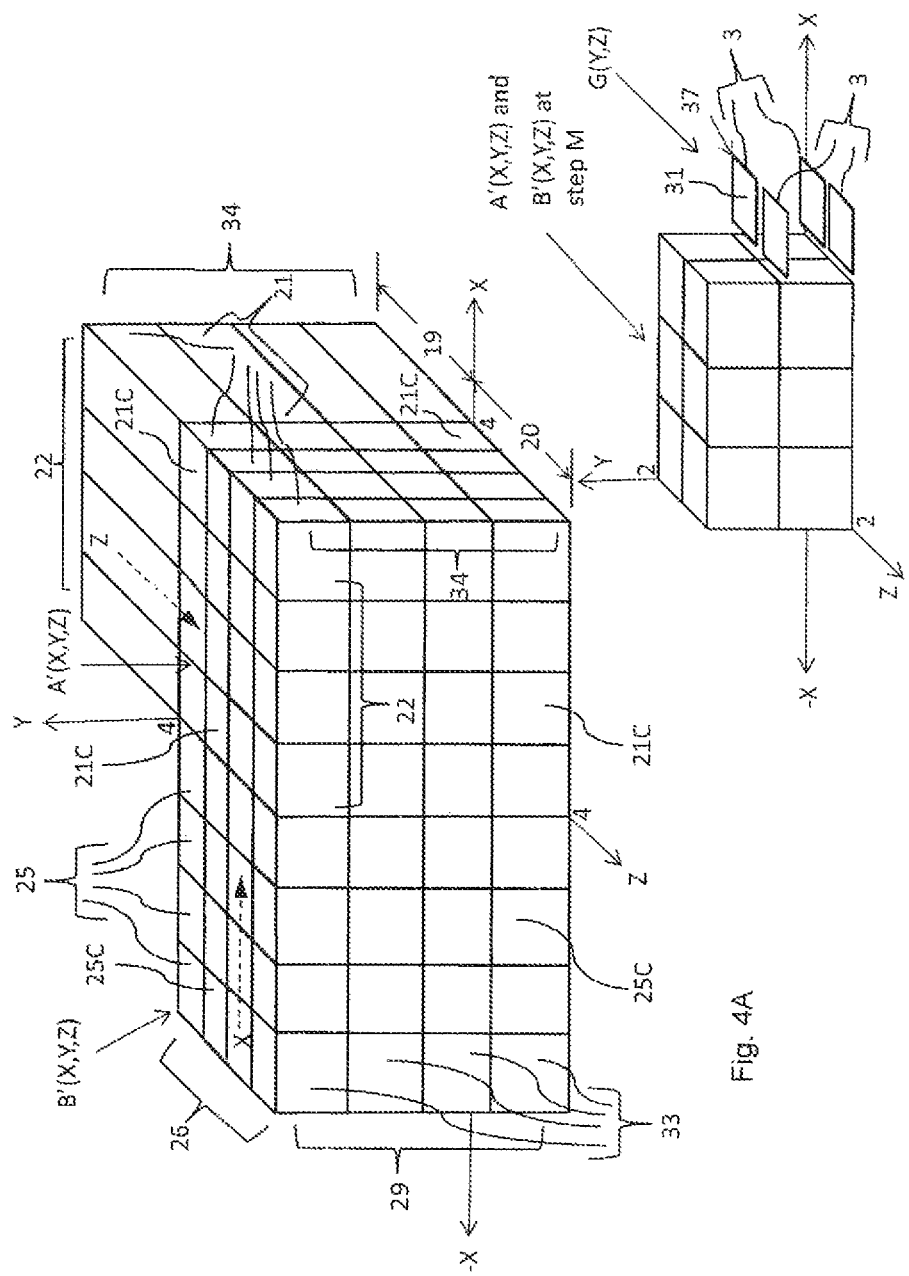

FIGS. 3a, 3b and 4 are illustrations of the mentioned matrices and how they interact. The matrices A(x,y), A'(x,y,z), B(y,z), B'(x,y,z) represent a mathematical way of describing the movement of the order track parts in relation to the article tracks in space. In FIG. 3a, the article track matrix A(x,y) represents articles in a fixed positions at the interface 19A between the storage section 19 and the distribution section 20. Each square of the article track matrix represents an article track 21. The article track matrix may here be seen as the foremost part (in z-direction) of the article track part matrix A'(x,y,z) when the foremost articles in z-direction has not been moved into the volume where the matrices interact (i.e. the volume of the positive x,y,z-quadrant of the coordinate system). In the same figure, the order track matrix B(y,z) represents order tracks in a fixed position. Each square of the order track matrix represents an order track 25. The order track matrix B(y,z) in FIG. 3a symbolizes the first part of the order track part matrix B(x,y,z) at time point t=0 before the order track part matrix is moved into the article track part matrix, i.e. into the volume where the matrices interact. FIG. 3b represents the client order matrix E(x,z), where each square represents a client column 33 in the x,z-plane. The order matrix is also shown at time point t=0. In the realization using endless loops for the order tracks, the order track parts following the first part are now in the process of returning to the start 25A of the order track, below the part of the track where the sorting is performed.

FIG. 4a shows in three-dimensions the interaction between the client order part matrix B'(x,y,z) with the article track part matrix A'(x,y,z). In this example both matrices are 4*4*4, but there may of course be many other possible matrix sizes. Let us assume that the article track part matrix is always in position 20, i.e. in the distribution section. This signifies in the system realization that there are always articles in a position for being delivered to the client order parts. The order track part matrix B'(x,y,z) is then moved in the x-direction step by step (1,2,3,4) into the article track part matrix and step by step (5,6,7,8) out of the article track part matrix. As the order track part matrix moves in steps, articles can be transferred between the interacting parts of the matrices, i.e. the parts having the same co-ordinate. In an embodiment, the order track part matrix B'(x,y,z) moves 2*m steps, where m is the number of article track columns and the number of order track parts of an order track. Within time period C, at steps 1 to m, the number of connections between article track parts and order track parts increases c0umulatively from 1*n*r to m*n*r, and at steps m to 2*m, the number of connections decreases cumulatively from m*n*r to 0. At 2*m, the order track matrix is back at its starting position again (like in FIG. 3). FIG. 4b shows A'(x,y,z) and B'(x,y,z) in position m, i.e. when in total overlap. FIG. 4b also shows the elevators 3 illustrated by positions 37 of the elevator carriages 31 where each carriage position represents a position in a carriage position matrix G(y,z). The carriage position matrix G(y,z) have co-ordinates Y: 1 to n and z: 1 to r. X is at value m+1. An elevator serves a column of carriages G(z) for all y-values from 1 to n. As the order track part matrix B'(x,y,z) moves further, the part of the order track matrix B'(m+1,y,z) will overlap the carriage position matrix and, consequently, at this time instant the articles will be transferred to the carriages, for same y,z matrix position.

According to an embodiment, there are article transferring means 21D arranged at crossings between article tracks and order tracks. There may be article transferring means at each crossing, which may signify that the number of article transferring means is the same as the number of article track parts. The article transferring means are operable for transferring articles positioned on an article track 21 to an order track 25. The article transferring means are also arranged for receiving a control signal from the control unit for triggering movement of an article to an order track such that a first 21Da of the plurality of article transferring means 21D moves a first article positioned on a first article track 21a to a first order track part 25Ca on a first order track 25a when a client to which the first order track part is associated has ordered a first article type according to the client order information, and when the first order track part 25Ca is in a correct position for being able to receive the first article. Such article transferring means makes it possible to move articles from the article tracks to the order tracks at the right time.

Figure 7A:
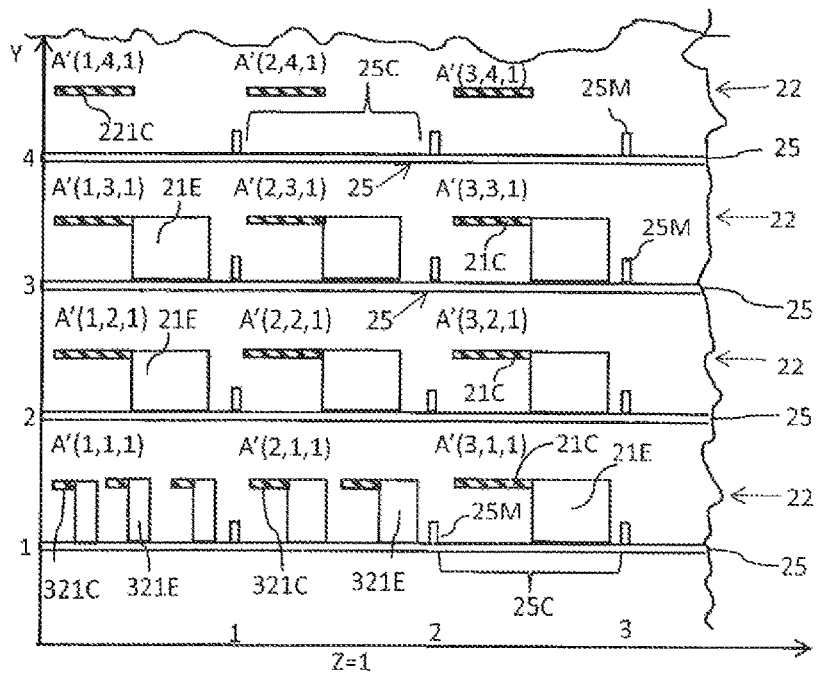
FIG. 7A-B are x,y-diagrams illustrating different types of article transfer means.
Figure 7B:
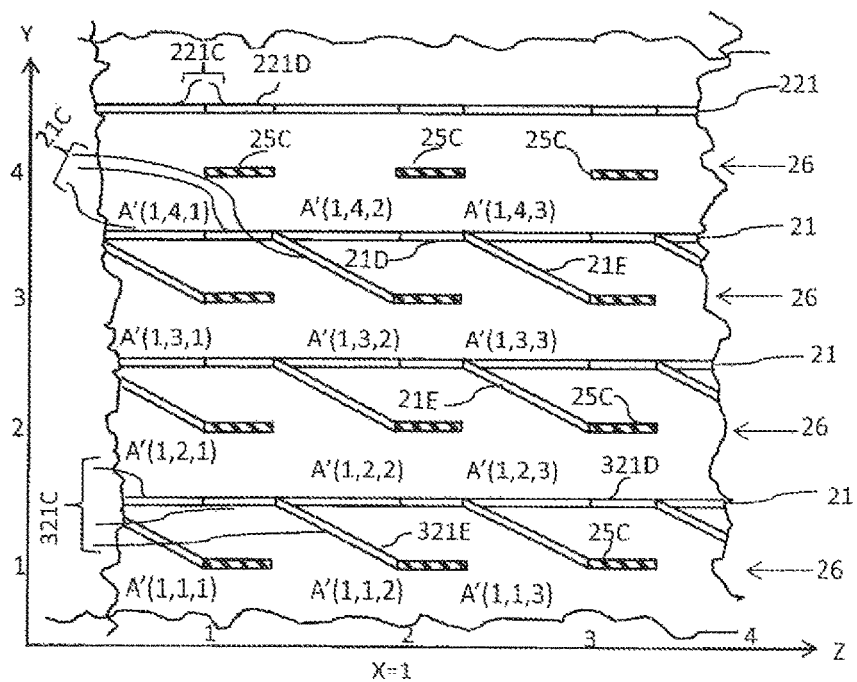

FIGS. 7a and 7b show different alternatives of how to transfer articles from the article tracks to the order tracks. The figures shows an example of an article track matrix A(x,y). In FIG. 7a the articles tracks are seen from the front side 12 towards the backside 11, i.e. in an opposite z-direction. In FIG. 7b the article tracks are seen from the left side 13 towards the right side 14, i.e. in the x-direction. The article tracks denoted 221, in y-axis position 4, has a width approximately half of the length of an order track part 25C. For the article tracks denoted 221, the articles are directly transferred to the order tracks by being pushed off the article track by the article transferring means 21D and falling down onto the order track below. The order tracks 25 are also shown in FIGS. 7a and b, and the order track parts 25C with their order track partitions 25M are clearly shown in FIG. 7a. The article tracks denoted 21, in y-axis position 2 and 3, also has a width of approximately half of the length of an order track part 25C. Here there are ramps 21E running from the article track downwards towards the order tracks 25 on which the articles will slide down onto the order tracks. The article tracks denoted 321C, in y-axis position 1, are narrower than the article tracks 21 and 221. In this example, the article tracks 321C have ramps 321E running from the article track downwards towards the order tracks 25. In this example, the article tracks 321C in x,y-position (1,1) have approximately the third of the width of the article tracks 21C and 221C such that there are space for three article tracks 321C with corresponding ramps 321E within the length of an order track part 25C. Further in this example, the article tracks 321C in x,y-position (2,1) have approximately half of the width of the article tracks 21C, 221C such that there are space for two such article tracks with corresponding ramps within the length of an order track part 25C The narrow tracks 321 may of course be arranged for direct transfer, i.e. without ramps, as well. The tracks with ramps are most suitable for articles sensitive to thrusts. The narrow ramps can be used for smaller articles such that even more different types of articles can be delivered to clients in the same total system space.

FIG. 2 also shows an embodiment of a single order section 2 combined with the sorting and distribution section 1. The single order section is arranged to handle packages addressed to clients of the sorting and distribution system, such as packages delivered as a postal service. By combining the single order section with the sorting and distribution section, both single order packages and articles sorted by the sorting and distribution system can be delivered at the collection section, and collected in the system simultaneously. In addition, the single order section 2 may be a stand-alone unit, i.e. work without the sorting and distribution section 1. The single order section is shown separately in FIG. 5.

Figure 5:
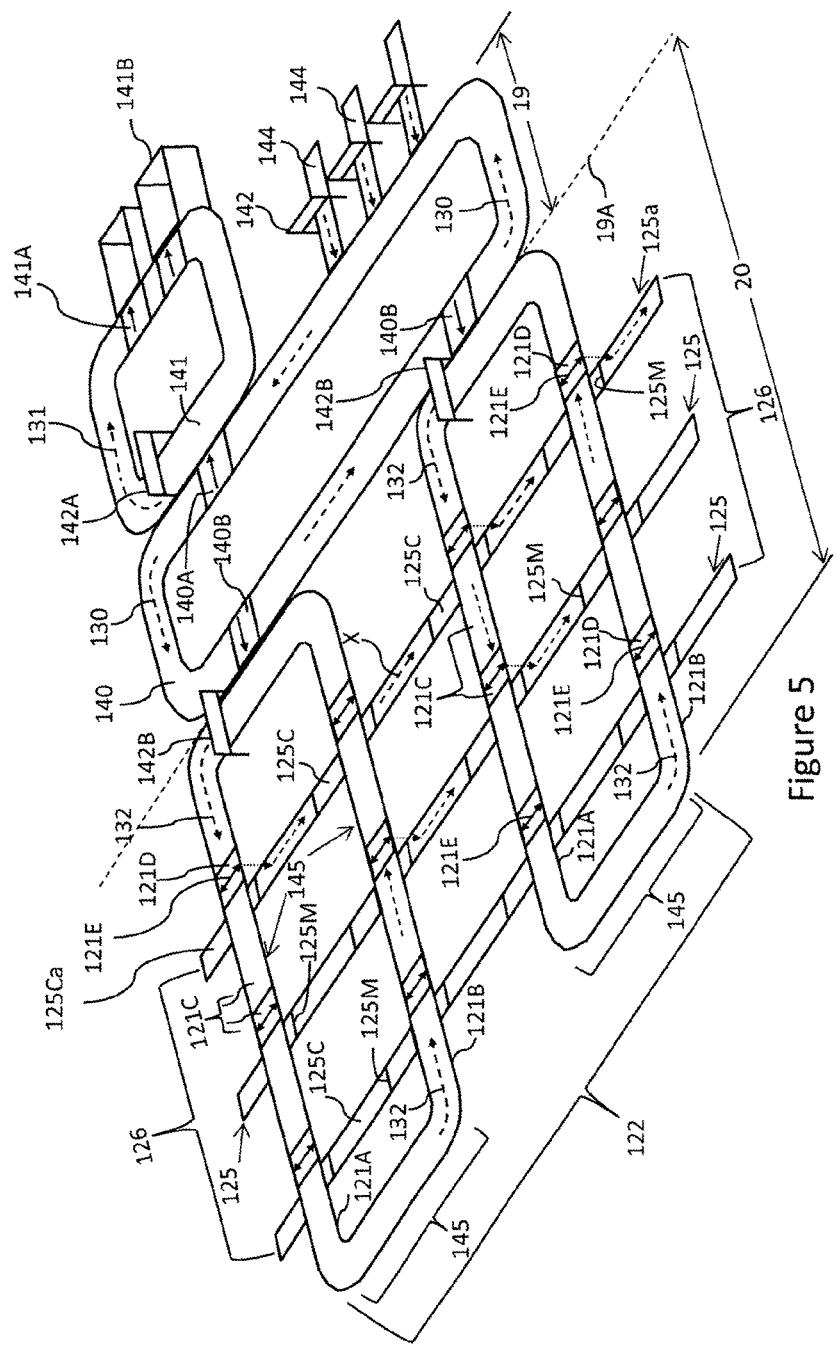
FIG. 5 is a perspective view of a single order system according to an embodiment.

The embodiment of the single order section 2 of FIG. 5 comprises at least one first closed loop track 145 (in FIG. 5 two first closed loop tracks) for receiving a first package addressed to a first client of the sorting and distribution system, each first closed loop track comprising a detector 142B for detecting that the first package is addressed to the first client. The single order section 2 further comprises a number of package delivery tracks 125 arranged in connection with the at least one first closed loop track, i.e. crossing the at least one first closed loop track, preferably arranged under the first closed loop track. The package delivery tracks 125 are arranged for delivering the received first package to a side of the package delivery tracks closest to a receiving section 42 of the system. Each package delivery track is divided into a plurality of delivery track parts 125C by separators 125M. Further, as a result of the detector 142B detecting that the first package is addressed to the first client, the control unit 40 is arranged to control movement of the first package such that the first package arranged on the first closed loop track 145 is moved to a first 125Ca of the delivery track parts of a first 125a of the number of package delivery tracks, the first delivery track part being associated with the first client. The delivery tracks are preferably endless loop tracks. The receiving section 42 is arranged at the side of the delivery tracks where the tracks make a u-turn to turn back to its opposite, starting side. By also equipping the sorting and distribution system with such a single order section, it is possible to deliver packages, e.g. parcels or letters, addressed to clients of the system. The packages may be distributed to a collecting section of the receiving section where also the ordered articles of the same clients are delivered (see FIG. 2). This makes it possible to deliver both addressed packages and ordered articles to the clients.

According to an embodiment, the control unit 40 is further arranged to control movement of the number of package delivery tracks 125 such that when the number of package delivery tracks are moved, the first delivery track part 125Ca arrives at the side of the package delivery tracks closest to the receiving section substantially simultaneously as the first order track part 25Ca arrives at the receiving section 42. Such a single order section with package delivery tracks driven in such a synchronicity with the order tracks of the sorting and delivering section makes it possible to deliver packages addressed to a client to the receiving section at the same time as articles ordered by the client arrives at the receiving section. According to an embodiment, the package delivery tracks are still, i.e. not moving, at steps 1 to m of each time period C. Further, the package delivery tracks may be moved at steps m+1 to 2*m of a time period C. However, in this embodiment the package delivery tracks are normally still and only occasionally, for example when it is time to collect packages and articles at the receiving section, the package delivery tracks are moved towards the receiving section. The package delivery tracks may according to another embodiment be driven individually such that one of the package delivery tracks is only driven when there are package to be delivered to the clients of that track.

According to an embodiment, the control unit is arranged to drive the tracks such that ordered articles are receive at the collecting section of the receiving section substantially simultaneously as the ordered articles arrive at the collecting section from the elevator carriages for one total client column 133. According to an embodiment, the number of delivery track parts of one of the package delivery tracks may equal the number of order track parts 25C of one of the plurality of order tracks 25. Thereby, synchronous driving is facilitated between the single order section 2 and the sorting and distribution section 1 at the time period C when packages are to be delivered to the receiving section. In other words, from steps m+1 to 2*m, if there are packages to deliver, the single order section and the sorting and distribution section are driven synchronously such that the delivery track parts 125C, and the order track parts 25C of one client column 33, which together forms the total client column 133, arrive substantially simultaneously at the receiving section.

According to an embodiment, the single-order section 2 further comprises an incoming closed loop track 140 for receiving incoming packages and delivering the incoming packages to one of the at least one first closed loop 145 or out from the system. The single order section further comprises at least one second detector 142 for detecting that the client address of the first packet is handled by this sorting and distribution system and that a client address of a second package is not handled by this sorting and distribution system. Further, the control unit 40 is arranged to control movement of the first package from the incoming closed loop track 140 to a first of the at least one first closed loop tracks 145 and to control movement of the second package from the incoming closed loop track 140 out from the system, based on the detection performed by the second detector. Thereby it is possible to automatically sort incoming addressed packages based on the address of the package (such as by detecting postal code on the packages) into packages to be delivered by this single-order section or by another single-order section of another sorting and delivery system.

As illustrated in FIG. 5 there may be more than one first closed loop track 145. In FIG. 5 there are two first closed loop tracks. The number of first closed loop tracks depends on the number of delivery track parts on the delivery tracks and of the way of moving the packages to the delivery track parts. Further, in the embodiment of FIG. 5 there are a number of filling tracks 144 (three in FIG. 5) on which packages are put. Each of the filling tracks has a filling detector 142 for detecting to which sorting and delivery system the individual packages are addressed. The filling tracks 144 are connected to the incoming closed loop track 140. Alternatively, these filling detectors 142 may be arranged at the incoming closed loop track 140 as only one detector. It may also be called a second detector. The embodiment of FIG. 5 also shows a first package transfer means 140A arranged at the incoming closed loop track 140 that depending on the address detected by any of the filling detectors 142 is instructed either to transfer the package to an outgoing closed loop track 141, if the detected address is at another system, or to let the package travel further on the incoming closed loop track if the address is taken care of by this system. Further, there are a number of second package transfer means 140B arranged on the incoming closed loop track but after the first package transfer means in the direction of travel of the incoming closed loop track. Depending on the address detected by any of the filling detectors 142, the second package transfer means 140B are instructed to either let the package travel further on the incoming closed loop track if the address is taken care of by another system or to transfer the package to the first closed loop track 145, if the detected address is taken care of by this system. Normally, the second package transfer means 140B will not receive any packages addressed to another system, such packages are already sorted out by the first package transfer means 140A. Alternatively, when there are two or more first closed loop tracks 145, the second package transfer means 140B are also instructed to deliver the packages to the right of the two or more first closed loops depending on the detected address. In this case the two or more closed loops are arranged to cater for different address spaces of the addresses handled by this system. At the outgoing closed loop track 141 there may be arranged an outgoing detector that detects to which other system the package is addressed on a number of outgoing package transfer means 141A that are instructed to transfer the outgoing package to a storage of a number of storages 141B depending on the address on the package, wherein each storage is allocated to one of a number of other systems.

When the single-order section of FIG. 5 is in use, an addressed packet is put on any of the filling tracks 144, the filling detector 142 of that filling track detects the address of the package. The package is thereafter distributed onto the incoming closed loop track 140. In the meantime, the filling detector 142 sends the detected address to the control unit 40 that sends an instruction to the first package transfer means 140A to transfer the package to the outgoing closed loop track 141 if the detected address is handled by another system or to let it pass further if the detected address is handled by this system. When the package is handled by this system, it subsequently reaches the second package transfer means 140B that transfers the package to the first closed loop track 145 if the address is handled by this system. If there are more than one first closed loop tracks there are also more than one second package transfer means and the second package transfer means only transfers the package to its corresponding first closed loop track if the address is in an address space handled at the first closed loop to which the second package transfer means belongs. This is exemplified in the following for an example with two first closed loops 145: left and right first closed loop where the left closed loop handles a first address space and the right closed loop handles a second address space, and where there are a left second package transfer means 140B for transferring packages to the left closed loop 145 and a right second package transfer means 140B for packages to the right closed loop 145. When the control unit determines that the address of a package detected by the filling detector is within the first address space, the control unit sends a signal to the left second package transfer means to transfer this package onto the left closed loop. On the other hand, when the control unit determines that the address of a package detected by the filling detector is within the second address space, the control unit sends a signal to the right second package transfer means to transfer this package onto the right closed loop. When the package has been transferred onto one of the first closed loops 145, a sorting detector 142B detects the address and sends the detected address to the control unit 40. The control unit 40 instructs a number of third package transfer means 121D arranged at the first closed loops 145 to transfer the package to the package delivery track 125 to which the article transfer means is arranged, if the address is associated with this package delivery track part 125C that is arranged below the individual third package transfer means.

Further, the individual third package transfer means 121D may be instructed to either transfer the package to the left or to the right from the first closed loop track onto different delivery track parts 125C depending on the detected address, or to let the package pass. I.e. if the detected address is connected to the delivery track part to the right of the first closed loop, the individual third package transfer means transfers the package to the right. If the detected address is connected to the delivery track part to the left of the first closed loop, the individual third package transfer means transfers the packet to the left. If the detected address is not to be handled by the individual third package transfer means but another third package transfer means further down of the first closed loop, the package travels past the individual package transfer means Thereby, the number of delivery track parts that can be reached from one closed loop track are doubled compared to if the third transfer means would only transfer articles in one direction. Further, the term closed loop track may signify a track that returns in the same level as it moves forward, like a track delivering baggage at an airport for example. In other words, where the surface of the track are always pointed substantially upwards. Other tracks such as the delivery tracks 125, the order tracks 25 and possibly also the article tracks 21 may be tracks that return with its track surface pointing downwards, like an escalator track. The first, second and third package transfer means may be of similar construction as described in FIG. 7 for the article transfer means.

FIGS. 6*a-d* describe mathematically how the single order section 2 and the sorting and delivery section may interact. In this case the number of package delivery tracks 125 is the same as the number of order tracks 25 and also the number of package delivery track parts 125C of each package delivery track is the same as the number of order track parts 25C of each order track. Matrix As(x,z) is a sorting direction matrix representing the sorting of packages onto package delivery tracks. Y is a fixed value of −1 to show that the matrix As(x,z) is positioned below the article track part matrix A'(x,y,z). Bs(x,z) is a single order matrix wherein each position represents a package delivery track part. Normally As and Bs have the same position. It is only when the package delivery tracks 125 are moved that Bs changes in relation to As. Y is a fixed value of −1 to show that the matrix Bs(x,z) is positioned below the order track part matrix B'(x,y,z). FIG. 6*b* shows the single order matrix Bs(x,z) and the order track part matrix B'(x,y,z) at the start of time period C, i.e. at time point 0. Between steps 1 and m, the order track part matrix B'(x,y,z) is moved in the x-direction but the single order matrix is in a fixed position. At position m the two matrices are in the same position (in x and z). Step m is shown in FIG. 6*c*. A column comprising both the client column 33 and a package delivery track part positioned in the same x,z-position as the client column together makes a total client column 133. D'(x,y,z) may then represent a total order track matrix, where each x,z-position represents packages and articles to be delivered to the same client. Of course a large client may have more than one such total client column 133.

According to an embodiment, when driving the tracks of the system, the time period C at which the order tracks and the package delivery tracks 125 perform one revolution are, as mentioned, divided into 2*m steps. Each step may take a time T so that T*2*m=C. Further, the time T may be divided into a moving time T1 when the matrices are moving and a stopping time T2 when the matrices are stopped e.g. for transferring articles between different tracks.

Figure 8:
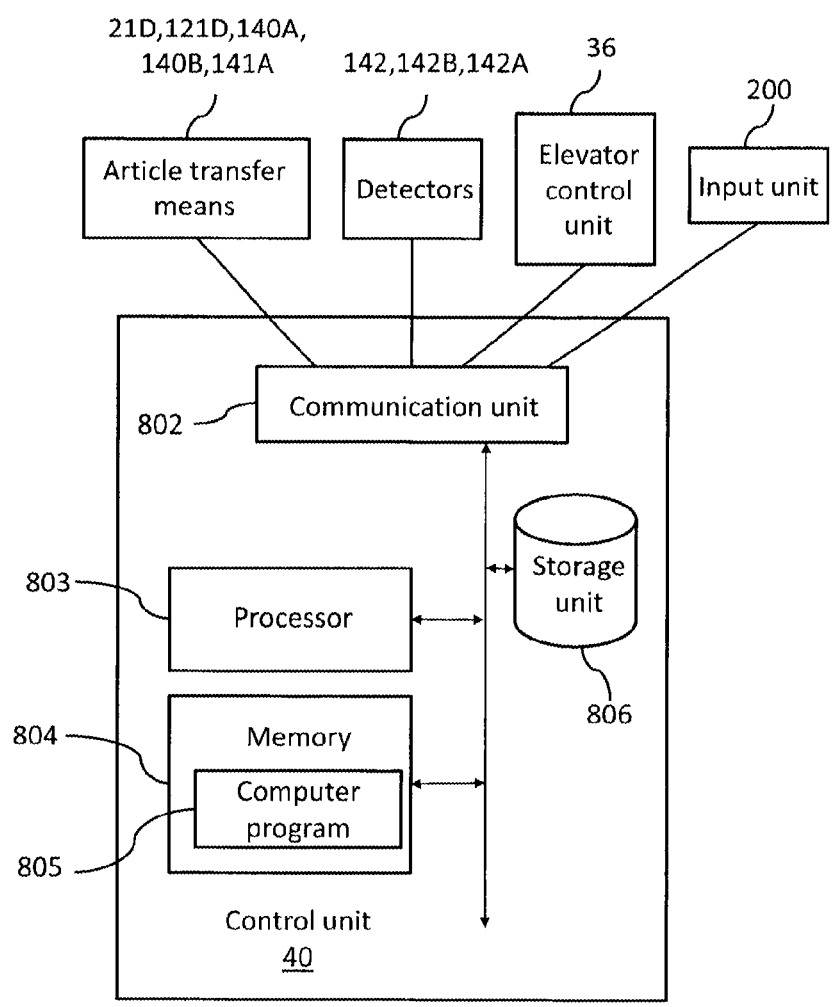
FIG. 8 is a schematic block diagram of a control unit connected to other units with which it is to communicate.

FIG. 8 describes an embodiment of a control unit 40. The control unit has a communication unit 802 for communicating with external units to receive instructions from external units, control external units and/or receive signals from sensors and detectors. Via the communication unit 802, the control unit is able to send control signals to the article transfer means 21D, 121D, 140A, 140B, 141A instructing individual article transfer means to transfers articles between tracks at the right moment. There may also be a separate track control unit which is connected between the control unit 40 and the article transfer means. The control unit 40 is also able to receive detector signals from sensors and detectors 142, 142B, 142A detecting addresses of packages, positions of order track parts etc. Further the control unit is connected to an elevator control unit 36 that controls the elevators 3 depending on signals received from the control unit. Further, the control unit is connected to an input unit 200 through which client order data is received. Client order data may be input manually through e.g. a key board or automatically as information that can be decoded by a processor (see below) of the control unit. The information received from these external units may be stored in the (processor) memory 804 or the storage unit 806. As mentioned, the control unit has a processor 803 and a memory 804 in which computer programs 805 such as control programs, algorithms and/or instructions are stored. The processor 803 is arranged to determine positions in the client order matrix E(x,z) for clients based on client order data such as name of client, which articles and how many of each article the client has ordered and information of article positions in the article track matrix A(x,y). Article positions may be received from the input unit or may be pre-stored in the storage unit 806/memory 804. Based on the determined client positions in the client order matrix E(x,z), article positions in the article track matrix A(x,y) and on the client order information, the control unit calculates a driving scheme for driving the order tracks 25, the article transfer means and the elevators 3 (in case the receiving section has elevators) such that articles are transferred from the article tracks to the correct order track part associated with a client according to the client order information. Further, in case there are elevators, the elevators are controlled to collect articles at the right moment when there are articles coming to the receiving section.

In more detail, the processor is arranged to determine connection position for order track parts and article track parts that are to be connected for transfer of articles (also called correct position for transfer of article). The connection position signifies same position in the article track part matrix A'(x,y,z) as in the order track part matrix B'(x,y,z), when the order track part matrix is moving in the x-direction into the article track part matrix. The number of moving steps $C_A$ to take in x-direction in time period C until the connection position is reached is determined by the difference in x-coordinates between the matrices for time point 0: $C_A=X_A-X_B$. For example, for an article track part in position (4,1,1) and order track part in position (−1,1,1) (in time point 0) this means that after 5 steps ($C_A$=4+(+1)=5) when $C_A$ is 5, the article transferring means in position (4,1,1) in the A'(x,y,z) matrix is triggered to move K articles of this type that the client of this order track part has ordered onto the order track part. K is the number of articles (or amount in for example kilograms).

Further, the processor is arranged to determine when to trigger the elevator control unit such that an elevator carriage 31 is controlled to move to the end of an order track to collect one or more articles. For an order track part at position B'(x1,y1,z1) in the order track part matrix at time point t=0, an elevator carriage is controlled to move to its receiving position G(m+1,y1,z1) to receive articles only when there are articles ordered for position (x1,y1,z1) at any step during the overlap. The step in time before the step to move to the receiving position is the same as the time step when the articles for position B(x1,y1,z1) arrive at x=m. This time step is m−X1, where X1 is the position for x1 at t=0.

FIG. 9 shows a very simplified example with a 2*2 article track matrix A(x,y), where A(1,1)=milk, A(1,2)=trouser, A(2,1)=pizza, A(2,2)=bread (please observe that the ordered article types are mere examples). Further, there are four clients arranged in a 2*2 client order matrix E(x,z), where E(0,1)=Eva, E(−1,1)=Mia, E(0,2)=Rik, E(−1,2)=Bo. The client order matrix E(x,z) is defined for a starting position at time point t=0 the step before the order track part matrix B'(x,y,z) is starting to be moved stepwise into the article track part matrix A'(x,y,z), see FIG. 9b. Further, in this example, Rik has not placed any orders, Bo has ordered 5 milk, 2 Pizza and 1 bread, Eva has ordered 3 bread and 1 trouser and Mia has ordered 4 pizza and 6 milk. All together there are 7 client orders, and each order is treated by the processor. For example, Bo has three orders. From the input unit 200 the processor 803 has received information that client Bo has ordered 5 milk. The processor determines client order position for Bo's order E(x,z)=(−1,2) and that milk is to be positioned on article track A(x,y)=(1,1). Then the processor determines which article transfer means on which article track part that is to transfer 5 milk to Bo and when. This will be in the same z-position as Bo's client order matrix, i.e. A(z)=B(z)=2, i.e. the article transfer means at article track part A'(x,y,z)=(1,1,2). The time step to transfer milk is $C_A$=A(x)−B(x)=1−(−1)=2. Then it is saved in the memory 804, a memory page Am(1,1,2) stating that from article track part (1,1,2), 5 articles (milk) are going to be transferred at time step 2. This memory page information is used for the processor to instruct the article transfer means at (1,1,2) to transfer 5 milk at time step 2.

Further, there is calculated at which step $C_G$ to send an elevator carriage to position G(m+1,1,2)=G(3,1,2) to collect the pieces of milk as $C_G$=m−B(x)=2−(−1)=3. The pieces of milk are then transferred to the elevator carriage at position G(3,1,2) in T1 of step 4. The processor checks the memory at each time step to see which articles at which positions that is to be transferred at the certain time step and gives control instructions to the correctly positioned article transfer means accordingly. These calculations are performed for each of the seven orders. When the calculations are performed, the order tracks are started simultaneously and driven synchronously. The time lines shown in FIG. 10 then show at which steps in time period C an article transferring means 21D handling a position x,y,z gets a control impulse from the control unit according to the memory page Am(x,y,z) for the same article track part position to perform a transfer of an article. The time lines of FIG. 10 further show when an elevator carriage 31 handling a receiving position (y,z) gets a control impulse from the control unit according to a memory page Gm(y,z) for the same receiving position y,z to collect articles from the order track.

Figure 10:
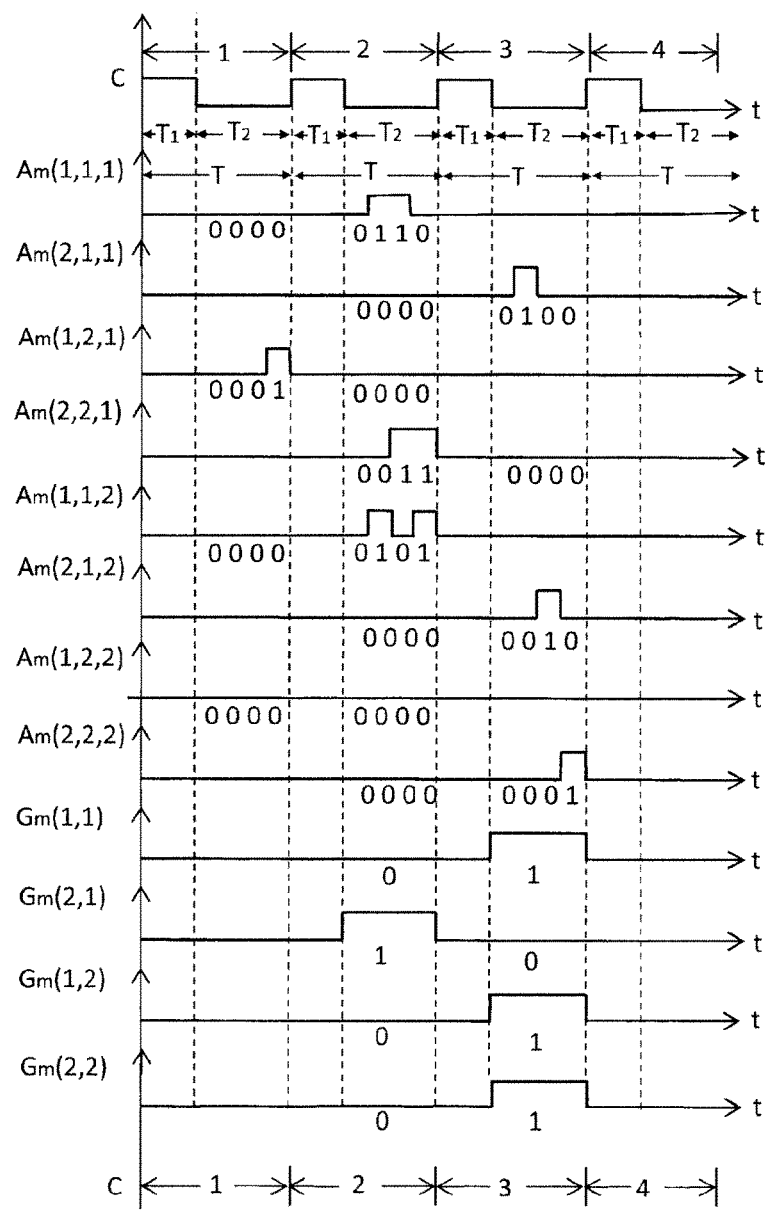
FIG. 10 shows timelines for signals in the system, to deliver orders as described in the example of FIG. 9A and 9B.

In FIG. 10 there are 4 time steps within the time period C. Each time step (1,2,3,4) has a first time step part T1 when the order track is moving and a second time step part T2 when the order track is standing still. At each second time step part, an article may be moved to an order track part, if the client to which the order track part belongs has ordered this article. For example, milk is positioned in x,y=(1,1). Bo has ordered 5 milk. Bo is in z-position 2. This means that according to memory page Am(1,1,2) the article transfer means 21D in article track part matrix A' position (1,1,2) will receive an instruction to transfer 5 milk at time step $C_A$=A(x)–B(x)=1–(–1)=2. In the memory pages Am there are also stored the number of articles to transfer at each time step, as binary values. The value 0101 in time step 2 for Am(1,1,2) in FIG. 10 is the binary value for 5. Bo has also ordered one bread, bread is positioned in A(x,y) position (2,2). As mentioned, Bo is allocated position B(x,z)=(–1,2). Further, A(z)=B(z)=2.This means that a memory page Am(2,2,2) is stored instructing the article transfer means 21D in position (2,2,2) to transfer one bread at step $C_A$=A(x)–B(x)=2–(–1)=3. Further, Bo has ordered 2 pizza. Pizza is in A(x,y)-position (2,1). This means that the article transfer means 21D in position (2,1,2) will receive an instruction to transfer 2 pizza at time step 3. Now at time step 3, after the transfer of articles, there are in position (1,1,2) 5 milk and in position (2,1,2) 2pizza and in position (2,2,2) 1 bread. This means that in Bo's client column E(–1,2), at step 3 there are 5milk and 2 pizza for the elevator carriage 31 responsible for position (x,y,z)=(2,1,2) to collect, and one bread for elevator carriage responsible for position (x,y,z)=(2,2,2) to collect. Consequently, the elevator carriages responsible for receiving positions (x,y,z)=(2,1,2) and (x,y,z)=(2,2,2), respectively, gets an instruction at time step 3 from the control unit via the elevator control unit to go to its corresponding receiving position and collect articles. At time T2 of step 3 the mentioned elevator carriages move to their corresponding receiving position and stay there at least during T1 of time step 4 when the order tracks moves and the articles are automatically moved to the elevator carriages. (The "1" in the time line signifies that the elevator control unit controls the elevator carriage to move to the receiving position.) After collecting articles at time step 4, the elevator carriages 31 are travelling to the collection section to drop off the orders ordered by Bo. Similar calculations are made for each order and for each time period, and based on the calculations control signals are sent to move articles and elevator carriages until all orders have been delivered.

Figure 11:
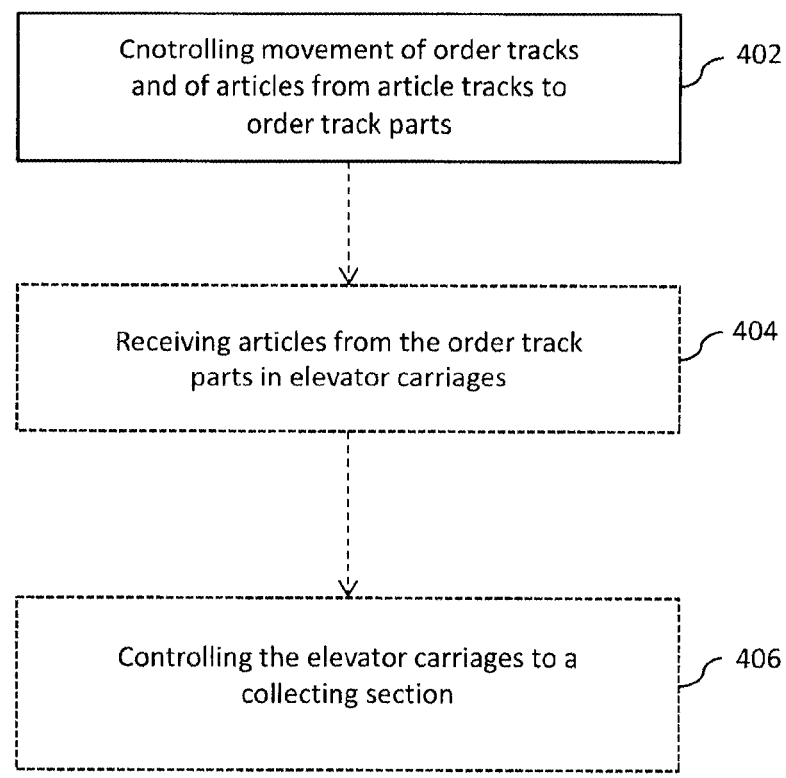
FIG. 11 is a flow chart of a method performed by a sorting and distribution system, according to an embodiment.

The invention may further be realized as a method of which an embodiment is described in FIG. 11. In FIG. 11 there is described a method performed by a sorting and distribution system, for sorting a number of different types of articles to a number of different clients depending on types and amounts of articles ordered by the different clients. The system comprises a plurality of article tracks, each articles track being arranged to receive and transport a type of article and a plurality of order tracks arranged substantially transverse to the plurality of article tracks, each order track being arranged as a rotating endless loop. The plurality of article tracks are arranged in relation to the plurality of order tracks such that articles situated on any of the article tracks can be moved to the order tracks. Further, each order track is divided into m order track parts by order track partitions. The method comprises controlling 402 movement of the plurality of order tracks and movement of articles arranged on the plurality of article tracks to the plurality of order tracks based on client order information received by the control unit such that a first article positioned on a first article track is moved to a first order track part of a first order track when a first client to which the first order track part is associated has ordered a first article type according to the client order information, and when the first order track part is in a correct position for receiving the first article. The controlling of the movement of the plurality of order tracks may be performed such that the plurality of order tracks are driven synchronously, rotating with a time period C.

According to an embodiment, the method further comprises receiving 404 articles from the first order track part 25C at an end 25B of the first order track 25 in a driving direction of the first order track 25 after the first order track part 25C has passed the article tracks 21.

According to another embodiment, the articles are received 404 by controlling a first 31a of a number of elevator carriages 31 of a first 3a of a number of elevators 3 such that the first elevator carriage is driven to a position nearby the end 25B of the first order track 25a when the first order track part 25Ca arrives at the end 25B of the first order track 25a.

According to another embodiment, the method further comprises, after receiving articles at the first elevator carriage, controlling 406 the first elevator carriage such that the first elevator carriage is driven to a collecting section for arriving at the collecting section substantially simultaneously with a second elevator carriage of the first elevator.

The invention claimed is:

1. A sorting and distribution system for sorting a number of different types of articles to a number of different clients depending on types and amounts of articles ordered by the different clients, the system comprising:
   a plurality of article tracks, each article track being arranged to receive and transport at least one type of article;
   a plurality of order tracks arranged substantially transverse to the plurality of article tracks,
   wherein,
   the plurality of article tracks are arranged in relation to the plurality of order tracks such that articles situated on any of the article tracks (21) can be moved to the order tracks,
   each order track is divided into m order track parts by order track partitions,
   the system further comprises a control unit controlling movement of the plurality of order tracks and movement of articles arranged on the plurality of article tracks to the plurality of order tracks based on client order information received by the control unit such that a first article positioned on a first article track is moved to a first order track part of a first order track when a first client to which the first order track part is associated has ordered a first article type according to the client order information, and when the first order track part is in a correct position for receiving the first article,
   the control unit is further arranged to control the plurality of order tracks such that they are driven synchronously, rotating with a time period C, and
   the control unit is arranged to drive the order tracks in steps T, stopping a time T2 for receiving articles from the article tracks and being driven a time T1 between each stop, the time period C=2*m*(T1+T2).

* * * * *